(12) United States Patent
Sanchez Rola et al.

(10) Patent No.: US 11,947,692 B1
(45) Date of Patent: Apr. 2, 2024

(54) SYSTEMS AND METHODS FOR DYNAMIC FORMJACKING PROTECTION

(71) Applicant: GEN DIGITAL INC., Tempe, AZ (US)

(72) Inventors: Iskander Sanchez Rola, Antibes (FR); David Luz Silva, Dublin (IE); Bahaa Naamneh, Oslo (NO)

(73) Assignee: GEN DIGITAL INC., Tempe, AZ (US)

(*) Notice: Subject to any disclaimer, the term of this patent is extended or adjusted under 35 U.S.C. 154(b) by 298 days.

(21) Appl. No.: 17/644,684

(22) Filed: Dec. 16, 2021

(51) Int. Cl.
*G06F 7/04* (2006.01)
*G06F 21/60* (2013.01)
*G06F 21/62* (2013.01)
*G06F 21/64* (2013.01)

(52) U.S. Cl.
CPC ........ *G06F 21/6209* (2013.01); *G06F 21/606* (2013.01); *G06F 21/6245* (2013.01); *G06F 21/64* (2013.01)

(58) Field of Classification Search
CPC .......... G06F 21/44; G06F 21/53; G06F 21/60; G06F 21/6245; G06F 21/6254; G06F 21/6209; G06F 21/606; G06F 21/64; H04L 63/0414; H04L 63/0421; H04L 63/1433; H04L 63/1475; H04L 63/1466; H04L 63/1483
See application file for complete search history.

(56) References Cited

U.S. PATENT DOCUMENTS

| | | | | |
|---|---|---|---|---|
| 10,878,057 B2* | 12/2020 | Van Rotterdam | ..... | G06F 3/0482 |
| 11,003,746 B1* | 5/2021 | Vashishtha | .......... | H04L 63/1408 |
| 11,165,820 B2* | 11/2021 | Vanunu | ............... | H04L 63/1466 |
| 2004/0205491 A1* | 10/2004 | Korala | ...................... | H04L 9/40 |
| | | | | 715/208 |

(Continued)

OTHER PUBLICATIONS

Eskandarian et al, Fideilius: Protecting User Secrets from Compromised Browsers, IEEE, May 23, 2019, pp. 264-280. (Year: 2019).*

(Continued)

*Primary Examiner* — Philip J Chea
*Assistant Examiner* — Jenise E Jackson
(74) *Attorney, Agent, or Firm* — Greenberg Traurig, LLP

(57) ABSTRACT

The disclosed computer-implemented method for dynamic formjacking protection may include identifying a sensitive data input field element on a webform loaded in a browser, creating a secure isolated container overlaid on the identified sensitive data input field element, and collecting, via the secure isolated container, real input data intended for the sensitive data input field element. The method may also include inserting dummy data into the sensitive data input field element and intercepting a form submit request from the webform to a destination. The method may further include determining whether the destination is a trusted destination, and when the destination is determined to be the trusted destination, modifying the form submit request to allow the real input data to be sent to the trusted destination. The method may also include sending the form submit (Continued)

request to the destination. Various other methods, systems, and computer-readable media are also disclosed.

20 Claims, 7 Drawing Sheets

(56) References Cited

U.S. PATENT DOCUMENTS

| | | | | |
|---|---|---|---|---|
| 2007/0271608 | A1* | 11/2007 | Shimizu | G06F 21/6263 |
| | | | | 726/17 |
| 2013/0111596 | A1* | 5/2013 | Rayes | H04L 41/0213 |
| | | | | 726/26 |
| 2014/0188734 | A1* | 7/2014 | Neuwirth | G06Q 20/322 |
| | | | | 705/65 |
| 2015/0040237 | A1* | 2/2015 | Vandervort | G06F 21/6254 |
| | | | | 726/26 |
| 2016/0342997 | A1* | 11/2016 | De Tella | G06Q 20/382 |
| 2020/0019489 | A1* | 1/2020 | Shanmugam | G06F 11/3664 |
| 2020/0053120 | A1* | 2/2020 | Wilcox | G06F 40/205 |

OTHER PUBLICATIONS

Shahriar et al, Client-Side Detecting of Cross-Site Request Forgery Attacks, IEEE, Nov. 1, 2010, pp. 358-367. (Year: 2010).*

* cited by examiner

| Name | Dan Jan |
|---|---|
| Number | 1234 4321 5678 8765 |
| Month | 09 |
| Year | 25 |
| CVV | 999 |

| Name | John Doe |
|---|---|
| Number | 4321 5678 9123 4321 |
| Month | 01 |
| Year | 22 |
| CVV | 111 |

SYSTEMS AND METHODS FOR DYNAMIC FORMJACKING PROTECTION

BACKGROUND

As users increasingly become comfortable and rely on online interactions, users may be increasingly expected to submit information online. For example, as e-commerce continues to replace in-person transactions, users may increasingly be comfortable with sharing their sensitive data such as credit card information online. As other interactions move online, users may increasingly share other sensitive data online. Unfortunately, criminals and other malicious parties have also increasingly targeted this sensitive data.

Formjacking is a technique used by malicious parties to steal sensitive data by hijacking an otherwise legitimate webform to forward or otherwise redirect the sensitive data input into the webform. A malicious actor may replace a legitimate webform with one hosted on their own server such that the malicious actor's server receives the sensitive data. Alternatively, the malicious actor may compromise the legitimate webform such that any input sensitive data is sent to the malicious actor's server. In other instances, the malicious actor may compromise the destination server itself.

Although security software may be able to detect specific cases of formjacking, such security software may not provide a general solution to protect against the various scenarios with high confidence. In addition, an overly aggressive security approach may prevent legitimate webforms from functioning correctly. The instant disclosure, therefore, identifies and addresses a need for systems and methods for dynamic formjacking protection.

SUMMARY

As will be described in greater detail below, the instant disclosure describes various systems and methods for dynamic formjacking protection.

In one example, a method for dynamic formjacking protection may include (a) identifying a sensitive data input field element on a webform loaded in a browser, (b) creating a secure isolated container overlaid on the identified sensitive data input field element, (c) collecting, via the secure isolated container, real input data intended for the sensitive data input field element, (d) inserting dummy data into the sensitive data input field element in response to collecting the real input data, (e) intercepting a form submit request from the webform to a destination, wherein the form submit request is prevented by the secure isolated container from including the real input data, (f) determining whether the destination is a trusted destination, (g) when the destination is determined to be the trusted destination, modifying the form submit request to allow the real input data to be sent to the trusted destination, and (h) sending the form submit request to the destination.

In some examples, identifying the sensitive data input field element may be based on an element attribute of the sensitive data input field element that is indicative of sensitive data.

In some examples, the secure isolated container may include an inline frame including an input field. In some examples, the secure isolated container may be associated with a secure domain. In some examples, the secure isolated container may be subject to one or more security mechanisms. In some examples, the one or more security mechanisms may prevent a non-included script from accessing the secure isolated container. In some examples, the one or more security mechanisms may include a same-origin policy that prevents elements having a different origin than an origin of the secure isolated container from interacting with the secure isolated container.

In some examples, determining whether the destination is a trusted destination is based on a whitelist. In some examples, the method may further include determining that the destination is not the trusted destination, and performing a security action. In some examples, performing the security action may include sending the form submit request with the dummy data to the destination, and analyzing a behavior from the destination in response to sending the form submit request.

In some examples, modifying the form submit request may further include identifying the dummy data in the form submit request and replacing the dummy data in the form submit request with the real input data. In some examples, modifying the form submit request may further include initiating a second form submit request using the real input data to replace the form submit request, and sending the form submit request may further include sending the second form submit request to the trusted destination.

In one embodiment, a system for dynamic formjacking protection may include several modules stored in memory, including an identification module, stored in memory, configured to identify a sensitive data input field element on a webform loaded in a browser, a container module, stored in memory, configured to create a secure isolated container overlaid on the identified sensitive data input field element, a collection module, stored in memory, configured to collect, via the secure isolated container, real input data intended for the sensitive data input field element, a dummy module, stored in memory, configured to insert dummy data into the sensitive data input field element in response to collecting the real input data, a security module, stored in memory, configured to intercept a form submit request from the webform to a destination, wherein the form submit request is prevented by the secure isolated container from including the real input data, determine whether the destination is a trusted destination, and when the destination is determined to be the trusted destination, modifying the form submit request to allow the real input data to be sent to the trusted destination, a submit module, stored in memory, configured to send the form submit request to the destination, and at least one physical processor that executes the identification module, the container module, the collection module, the dummy module, the security module, and the submit module.

In some examples, identifying the sensitive data input field element may be based on an element attribute of the sensitive data input field element that is indicative of sensitive data.

In some examples, the secure isolated container may include an inline frame including an input field. In some examples, the secure isolated container may be associated with a secure domain. In some examples, the secure isolated container may be subject to one or more security mechanisms, the one or more security mechanisms may prevent a non-included script from accessing the secure isolated container, and the one or more security mechanisms may include a same-origin policy that prevents elements having a different origin than an origin of the secure isolated container from interacting with the secure isolated container.

In some examples, the security module may be further configured to determine that the destination is not the trusted destination, send, in response to determining that the destination is not the trusted destination, the form submit request with the dummy data to the destination, and analyze a behavior from the destination in response to sending the form submit request.

In some examples, modifying the form submit request may further include identifying the dummy data in the form submit request, and replacing the dummy data in the form submit request with the real input data. In some examples, modifying the form submit request may further include initiating a second form submit request using the real input data to replace the form submit request, and sending the form submit request may further include sending the second form submit request to the trusted destination.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (a) identify a sensitive data input field element on a webform loaded in a browser, (b) create a secure isolated container overlaid on the identified sensitive data input field element, (c) collect, via the secure isolated container, real input data intended for the sensitive data input field element, (d) insert dummy data into the sensitive data input field element in response to collecting the real input data, (e) intercept a form submit request from the webform to a destination, wherein the form submit request is prevented by the secure isolated container from including the real input data, (f) determine whether the destination is a trusted destination, (g) when the destination is determined to be the trusted destination, modifying the form submit request to allow the real input data to be sent to the trusted destination, and (h) send the form submit request to the destination.

In some examples, the instructions may further include instructions for determining that the destination is not the trusted destination, sending, in response to determining that the destination is not the trusted destination, the form submit request with the dummy data to the destination, and analyzing a behavior from the destination in response to sending the form submit request. In some examples, the instructions for modifying the form submit request may further include instructions for identifying the dummy data in the form submit request, and replacing the dummy data in the form submit request with the real input data. In some examples, the instructions for modifying the form submit request may further include instructions for initiating a second form submit request using the real input data to replace the form submit request, and the instructions for sending the form submit request may further include instructions for sending the second form submit request to the trusted destination.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

FIGS. 4A-B are example webform browser screens for dynamic formjacking protection.

FIGS. 5A-B are example webform submit requests for dynamic formjacking protection.

Figure 1:
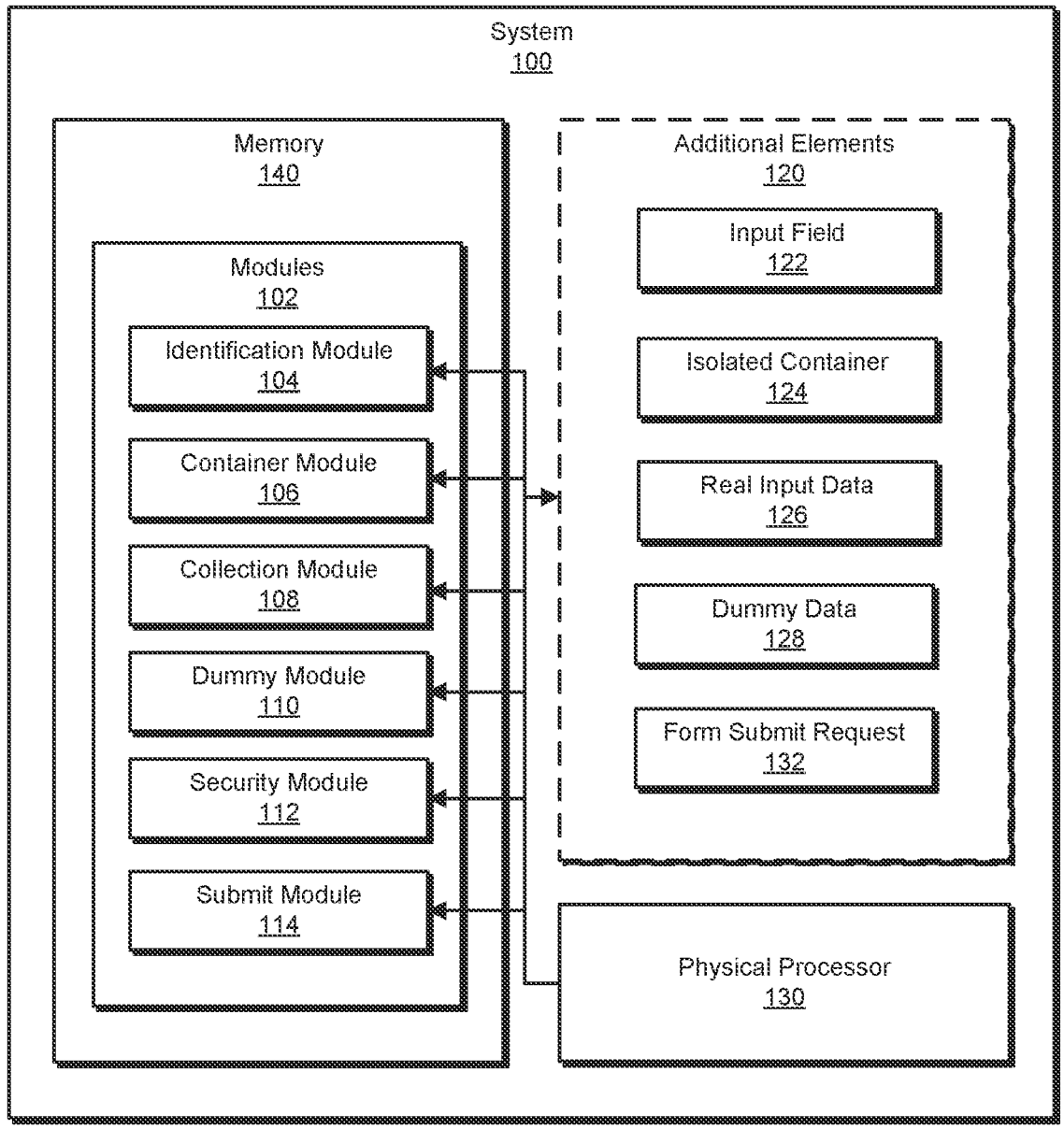
FIG. 1 is a block diagram of an example system for dynamic formjacking protection.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for dynamic formjacking protection. As will be explained in greater detail below, by overlaying a secure isolated container onto a sensitive data input field element in a webform, collecting real input data with the secure isolated container while inserting dummy data into the input field element, and intercepting a form submit request from the webform to a destination, the systems and methods described herein may verify whether the destination is a trusted destination for sensitive data. By replacing the dummy data with the real input data when the destination is confirmed to be trustworthy, the systems and methods described herein may be able to dynamically protect sensitive data against formjacking while preserving functionality of trustworthy webforms.

In addition, the systems and methods described herein may improve the functioning of a computing device itself by providing dynamic protection without requiring breaking a website's functionality. These systems and methods may also improve the field of web security by providing a general and scalable solution to various forms of formjacking.

Figure 2:
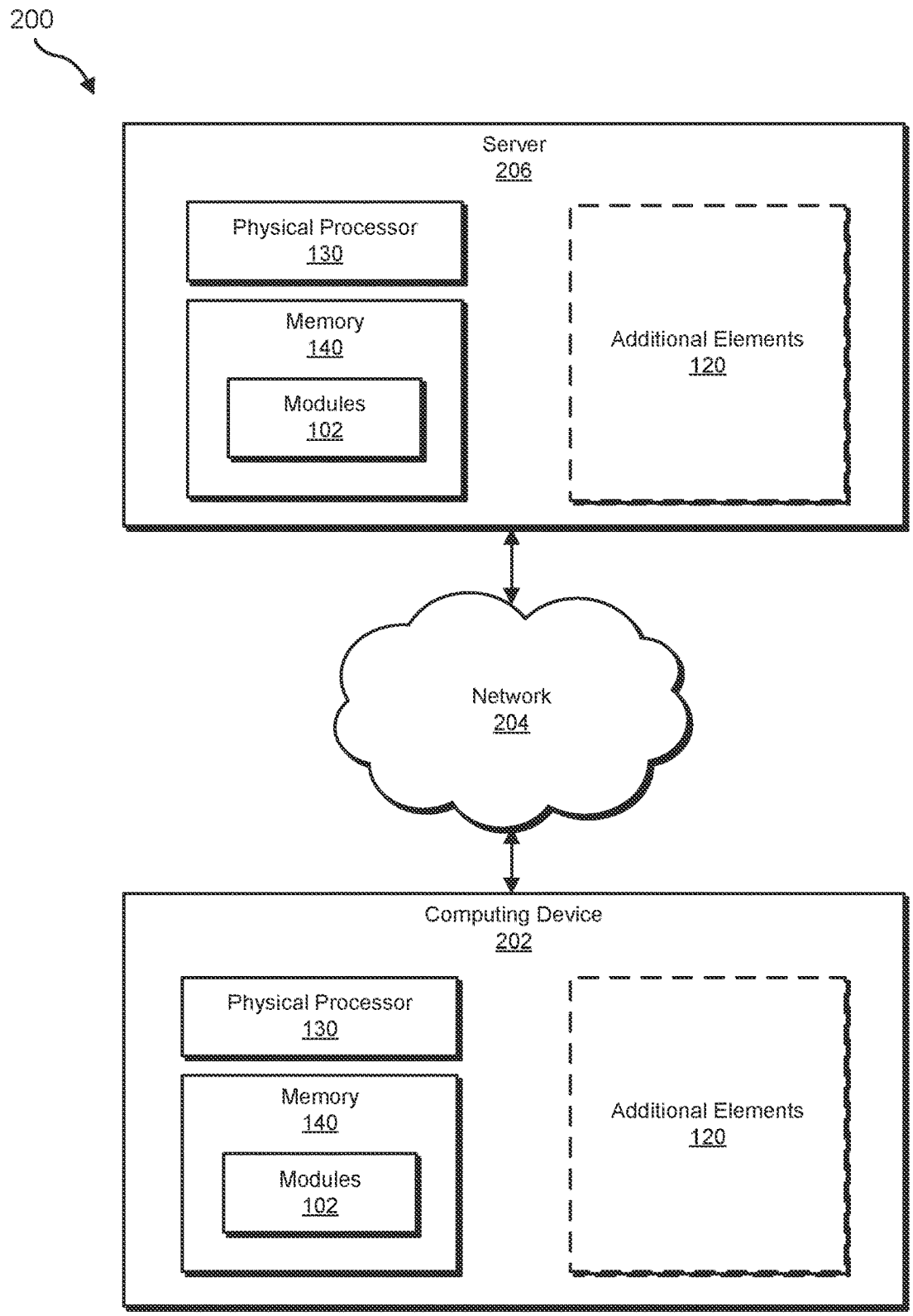
FIG. 2 is a block diagram of an additional example system for dynamic formjacking protection.

The following will provide, with reference to FIGS. 1-2, detailed descriptions of example systems for dynamic formjacking protection. Detailed descriptions of corresponding computer-implemented methods will also be provided in connection with FIG. 3. Detailed descriptions of example webforms will be provided in connection with FIGS. 4A-B. Detailed descriptions of example submit requests will also be provided in connection with FIGS. 5A-B. In addition, detailed descriptions of an example computing system and network architecture capable of implementing one or more of the embodiments described herein will be provided in connection with FIGS. 6 and 7, respectively.

FIG. 1 is a block diagram of an example system 100 for dynamic formjacking protection. As illustrated in this figure, example system 100 may include one or more modules 102 for performing one or more tasks. As will be explained in greater detail below, modules 102 may include an identification module 104, a container module 106, a collection module 108, a dummy module 110, a security module 112, and a submit module 114. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate dynamic formjacking protection. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120, such as an input field 122, an isolated container 124, real input data 126, dummy data 128, and a form submit request 132. Additional elements 120 generally represents any type or form of data and/or software modules.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to provide dynamic formjacking protection. For example, and as will be described in greater detail below, one or more of modules 102 may cause computing device 202 and/or server 206 to identify a sensitive data input field, create a secure isolated container overlaid on the sensitive data input field, collect real input data, insert dummy data into the sensitive data input field element, intercept a form submit request from the sensitive data input field to a destination, determine whether the destination is trusted, modify the form submit request to include the real input data when the destination is trusted, and send the form submit request to the destination.

Computing device 202 generally represents any type or form of computing device capable of reading computer-executable instructions. For example, computing device 202 may be a user device having a web browser. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of hosting security software. For example, server 206 may be a security server. Additional examples of server 206 include, without limitation, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
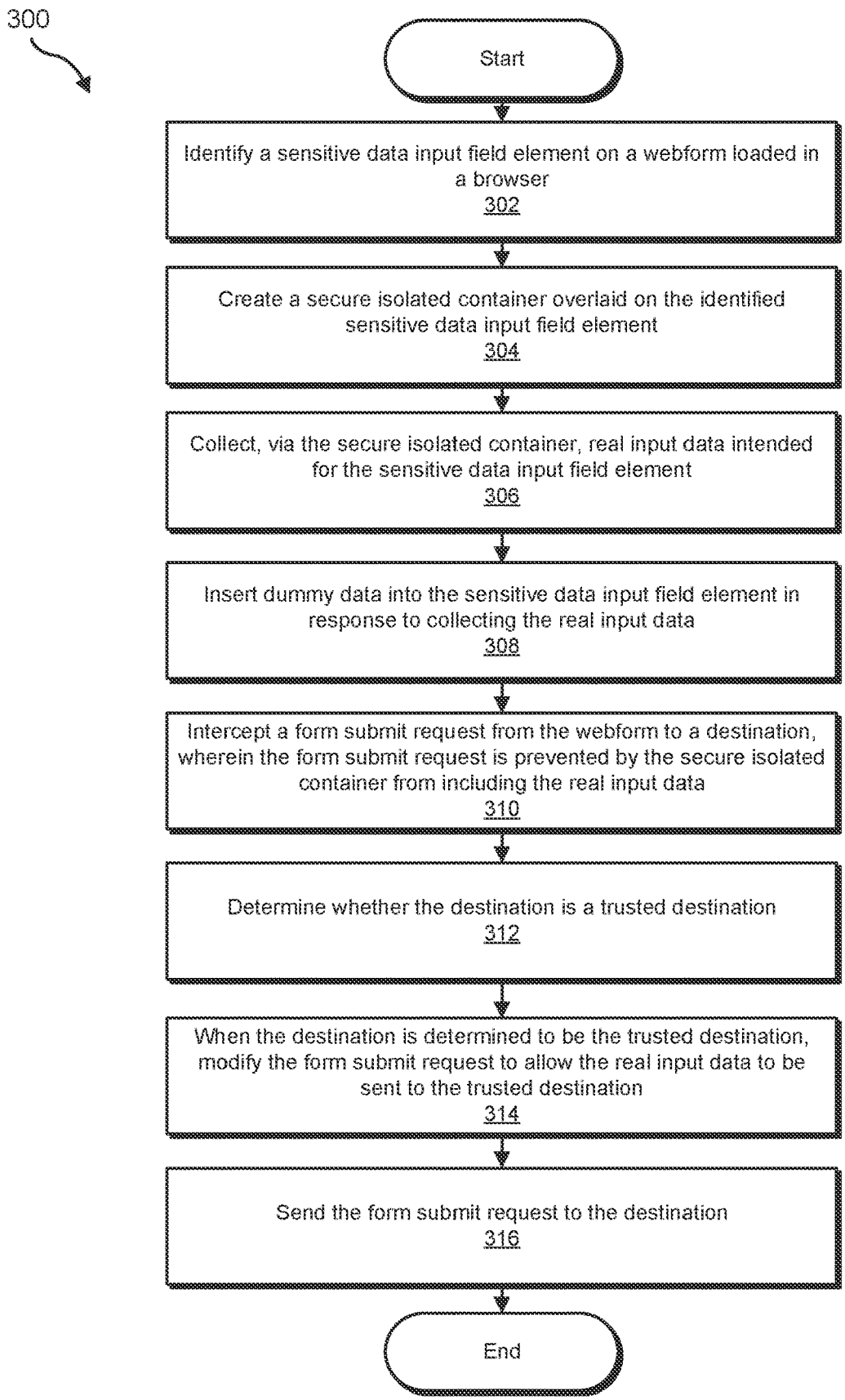
FIG. 3 is a flow diagram of an example method for dynamic formjacking protection.

FIG. 3 is a flow diagram of an example computer-implemented method 300 for dynamic formjacking protection. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify a sensitive data input field element on a webform loaded in a browser. For example, identification module 104 may, as part of computing device 202 in FIG. 2, identify input field 122 as a sensitive data input field element.

In some embodiments, the term "sensitive data" may refer to data not intended to be made publicly available. In the context of formjacking, sensitive data may include a user's personal information, such as financial data, personally identifiable data, health data, and other personal data. Other examples of sensitive data include, without limitation, proprietary data, confidential data, etc.

Figures 4A, 4B:
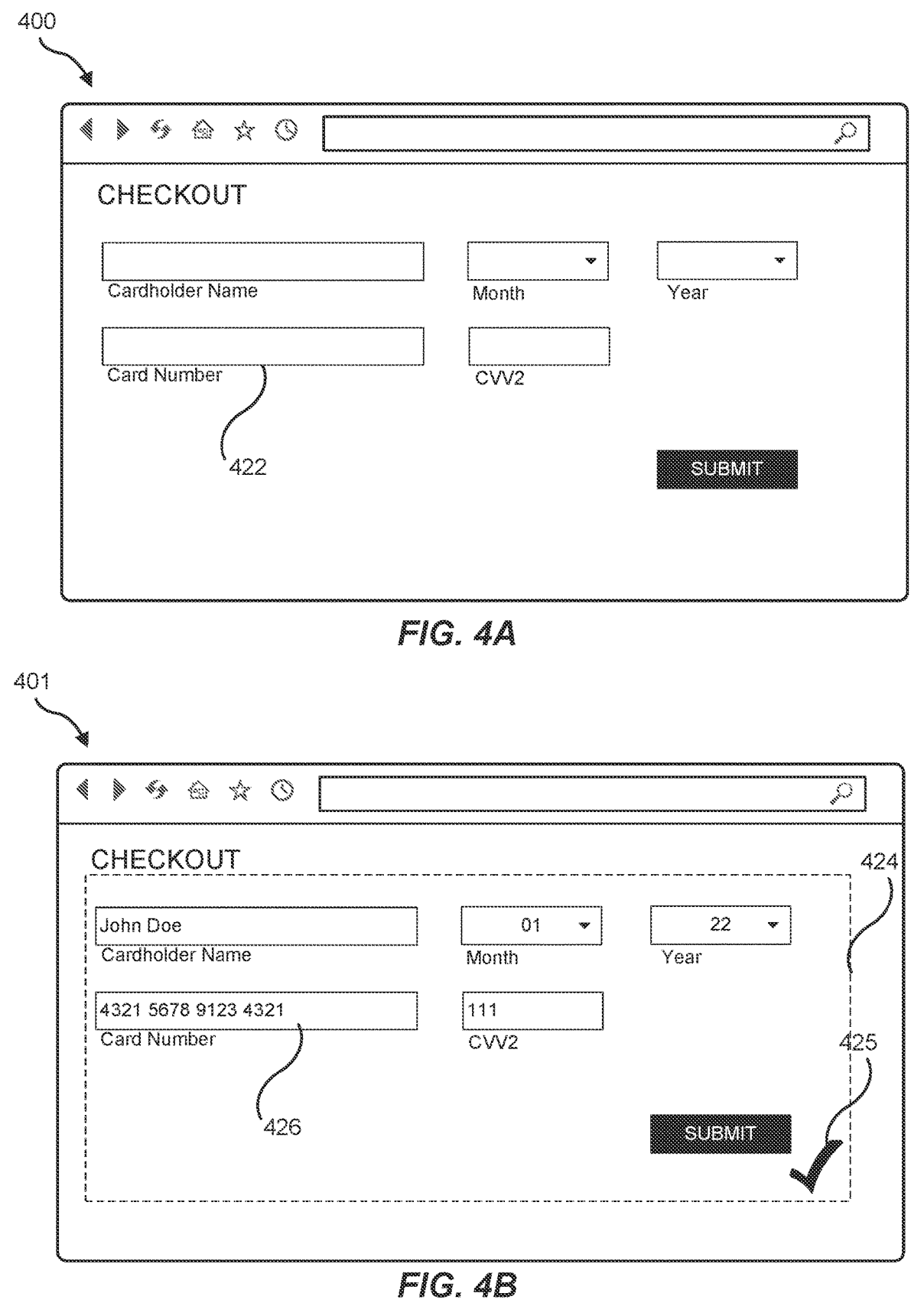

FIG. 4A illustrates a website 400 as may be shown in a browser. Website 400 may correspond to a webform and more specifically, an online shopping checkout form in which a user may input their sensitive data (e.g., credit card information) to complete an online purchase. Website 400 may include at least one input field 422 (which may correspond to input field 122) to allow the user to input their sensitive data.

Identification module 104 may identify the sensitive data input field element based on an element attribute of the sensitive data input field element that is indicative of sensitive data. For example, in FIG. 4A, identification module 104 may identify one or more input fields 422 as sensitive data input fields based on identifying attribute names (e.g., card number, cardholder name, CVV, etc.) associated with sensitive data. In other examples, identification module 104 may identify sensitive data input field elements based on other observable attributes, such as website 400 itself (e.g., by recognizing website 400 as a payment form or other form known for receiving sensitive data).

Turning back to FIG. 3, at step 304 one or more of the systems described herein may create a secure isolated container overlaid on the identified sensitive data input field element. For example, container module 106 may, as part of computing device 202 in FIG. 2, create isolated container 124 that may be overlaid on input field 122. Isolated container 124 may act as a secure input field to replace input field 122, as will be described further below.

FIG. 4B illustrates a website 401 that may correspond to website 400. As compared to FIG. 4A, FIG. 4B illustrates an isolated container 424 (which may correspond to isolated container 124) that may be overlaid at least input field 422. Isolated container 424 may comprise an inline frame (e.g., "iframe") that includes an input field. As shown in FIG. 4B, isolated container 424 may not materially alter a visual layout of website 401. The input fields of isolated container 424 may align with input fields 422. Although in FIG. 4B a single isolated container 424 may be overlaid every sensitive data input field 422, in other examples each input field 422 may be overlaid with a corresponding isolated container 424.

Isolated container 424 may be made secure using various mechanisms. Isolated container may be associated with a secure domain, such as a known security server (e.g., server 206). For instance, isolated container 424 may originate from, be loaded from, and/or be created by a script from the secure domain.

Isolated container 424 may also be subject to one or more security mechanisms. The security mechanisms may prevent a non-included script from accessing isolated container 424. For example, scripts not included with isolated container 424, even scripts that may be associated with website 401 itself, may be prevented from accessing isolated container 424. In addition, a same-origin policy may prevent elements having a different origin than the origin of isolated container 424 from interacting with isolated container 424.

In some embodiments, isolated container 424 may include a visual indicator 425 to indicate to the user that the user's sensitive data may be protected. For instance, website 400 may initially load, and visual indicator 425 may be displayed once isolated container 424 is ready.

Returning to method 300, at step 306 one or more of the systems described herein may collect, via the secure isolated container, real input data intended for the sensitive data input field element. For example, collection module 108 (which may correspond to isolated container 124) may, as part of computing device 202 in FIG. 2, collect real input data 126 that may be intended for input field 122. Real input data 126 may correspond to the user's sensitive data that may be intended to be input into input field 122.

FIG. 4B illustrates how real input data 426 (which may correspond to real input data 126) may be input into and collected by isolated container 424. Because isolated container 424 is overlaid onto input field 422, the user may input real input data 426 into isolated container 424 rather than input field 422. In addition, isolated container 424 may prevent the user from inputting real input data 426 into input field 422. As shown in FIG. 4B, real input data 426 may include the user's credit card information.

Turning back to FIG. 3, at step 308 one or more of the systems described herein may insert dummy data into the sensitive data input field element in response to collecting the real input data. For example, dummy module 110 (which may correspond to isolated container 124) may, as part of computing device 202 in FIG. 2, insert dummy data 128 into input field 122. Dummy data 128 may include fake data that may appear similar to real input data 126 without revealing any of real input data 126. For example, dummy data 128 may include fake data having similar type of data and/or format as real input data 126.

Dummy module 110 may insert dummy data 128 into input field 122 transparent to the user. For example, in FIG. 4B, as the user inputs real input data 426 into isolated container 424, dummy module 110 may insert corresponding dummy data into input field 422. The user may not be actively notified so as not to confuse the user or otherwise diminish the user's experience, although in other embodiments the user may be notified as to the dummy data.

At step 310 one or more of the systems described herein may intercept a form submit request from the webform to a destination. For example, security module 112 may, as part of computing device 202 in FIG. 2, intercept form submit request 132. Form submit request 132 may be prevented by isolated container 124 (e.g., at step 306 and/or step 308) from including real input data 126.

The user may submit the webform including input field 122 to generate form submit request 132. Form submit request 132 may be intended for an original destination of the webform. Because form submit request 132 includes data input into input field 122, form submit request 132 may include dummy data 128 rather than real input data 126.

FIG. 5A illustrates a form submit request 532 (which may correspond to form submit request 132) that may be generated in response to submitting website 401. Rather than including real input data 426, form submit request 532 may include dummy data that appears similar, in type and/or format, to real input data 426 without including any of real input data 426. Thus, even if no further security actions are taken, the user's sensitive data may be protected. However, as will be described further below, in certain scenarios the user's sensitive data may be safe to send to the destination to preserve intended functionality (e.g., submit the user's payment information to complete a purchase). Although FIG. 5A illustrates form submit request 532 as a table for easier readability, form submit requests as discussed herein may be formatted in various ways. In some examples, form submit requests may be formatted as a string of characters including data (e.g., dummy data) that may be parsed. In some examples, form submit requests may include obfuscation of data contained therein, for instance using base64 obfuscation. In some examples, form submit requests may be encrypted.

Returning to FIG. 3, at step 312 one or more of the systems described herein may determine whether the destination is a trusted destination. For example, security module 112 may, as part of computing device 202 in FIG. 2, determine whether the destination of form submit request 132 is a trusted destination. Security module 112 may determine whether the destination is a trusted destination based on a whitelist or other suitable secure verification of the destination to ensure that the destination is legitimate and/or has not been compromised.

At step 314 one or more of the systems described herein may, when the destination is determined to be the trusted destination, modify the form submit request to allow the real input data to be sent to the trusted destination. For example, security module 112 may, as part of computing device 202 in FIG. 2, modify form submit request 132 by replacing dummy data 128 therein with real input data 126, when security module 112 has determined the destination to be trustworthy. In such examples, form submit request 132 may not be encrypted or may otherwise be parsed by security module 112.

FIG. 5B illustrates a form submit request 533 modified by security module 112. In some examples, security module 112 may determine that the destination for form submit request 532 is a trusted destination. In other words, real input data 426 may be safely submitted to the intended destination of the webform in website 401. As shown in FIG. 5B, security module 112 may identify the dummy data, which may include identifying and decoding obfuscated data and/or in certain scenarios, decrypting encrypted data. Security module 112 may update the dummy data (as shown in FIG. 5A) with real input data 426 (as shown in FIG. 5B). Form submit request 533 may be safe to submit as originally intended.

In some embodiments, security module 112 may not be able to feasibly update form submit request 132 to replace dummy data 128 with real input data 126. For example, form submit request 132 may be encrypted or otherwise dummy data 128 may not be identifiable in form submit request 132. In such embodiments, modifying form submit request 132 may further include initiating a second form submit request using the real input data to replace form submit request 132. For example, security module 112 may initiate the second form submit request (e.g., by inputting real input data 126 into input field 122 and activating a submit function of the webform) to generate the second form submit request. The second form submit request may replace form submit request 132, for instance when sending form submit request 132 as will be described further below.

In some embodiments, security module 112 may further analyze which parties generate form submit request 132 and how form submit request 132 is generated. For example, security module 112 may analyze which script, function, or code segment generated form submit request 132. Security module 112 may use this submit request analysis to generate the second form submit request as needed, for instance by rerunning the appropriate script. Optionally, security module 112 may use the submit request analysis to further validate the scripts, such as by determining whether the script originated from a trusted domain, or to detect whether a duplicate form submit request was generated in parallel to form submit request 132.

In addition, security module 112 may perform the submit request analysis for the purpose of generating the second form submit request, as described above, although in other example, security module 112 may perform such analysis at other times (e.g., at step 310 and/or step 312).

At step 316 one or more of the systems described herein may send the form submit request to the destination. For example, submit module 114 may, as part of computing device 202 in FIG. 2, submit form submit request 132 to the destination.

Because security module 112 has previously identified the destination (e.g., at step 312) and modified form submit request 132 to include real input data 126 when the destination is trustworthy, (e.g., at step 314), form submit request 132 may only send real input data 126 to a trustworthy destination. When the destination is not confirmed trustworthy (e.g., is known to be unsafe or is unknown as to its trustworthiness), security module 112 may not modify form submit request 132 such that form submit request 132 may continue to contain dummy data 128 rather than real input data 126.

As described above, in some embodiments modifying form submit request 132 may include generating the second from submit request that includes real input data 126 such that sending the form submit request may include sending the second form submit request to the destination rather than form submit request 132. Alternatively and/or in addition, intercepting the initial form submit request 132 (e.g., at step 310) may interfere with the submission process. In such embodiments, submit module 114 may initiate and send the second form submit request, which may include real input data 126 if security module 112 identifies the destination as trustworthy and may include dummy data 128 otherwise.

In some embodiments, when security module 112 determines that the destination is not a trusted destination, security module 112 may perform a security action. In some examples, the security action may include sending form submit request 132 with dummy data 128 to the destination. Security module 112 (which may alternatively and/or in addition be part of server 206), analyze a behavior from the destination in response to sending form submit request 132. If form submit request 132 were sent without dummy data, such as with no data, security module 112 may have a reduced ability to analyze the behavior from the destination. For example, if the destination were compromised and under control of a malicious party, the malicious party may be alerted to potential detection in response to receiving an empty form submit request.

As explained above in connection with method 300, a dynamic formjacking protection system as described herein may provide protection against formjacking. The dynamic formjacking protection system may provide protection based on isolation, mimicking, and monitoring. The dynamic formjacking protection system described herein may be implemented directly in a custom browser or as a browser extension that may run dynamically while a user browses websites.

Once the dynamic formjacking protection system detects a webform for sensitive data (e.g., a payment page), the system may initiate isolation. The system may create an iframe on top of every input element, each iframe pointing to a secure domain. Each iframe may include an input field such that the user may input their sensitive data (e.g., credit card information) into a secure isolated container rather than the original input element. Because the information is stored in the iframe, no other script in the page may be able to read the information because the iframe's contents may be protected with a same-origin policy as well as other related security and privacy mechanisms that may be offered by the browser.

In order to understand which scripts may want to access the information typed by the user in a legit manner, some data rather than null data may be offered. At the same time as the user types real data into the isolated container, fabricated data mimicking the user may be input into the original input elements. The scripts in the page maybe able to access this fabricated data in the same original context.

With the fabricated data input, the dynamic formjacking system may monitor how different scripts loaded in the page access the data and what output requests are generated when the user clicks submit (e.g., "buy"). For example, if two code snippets read the data and later create requests, the system may block all output requests and check the domains where the data is to be sent. If the system identifies that the script is actually sending the information to a legit payment platform or bridge, the system may allow the script the access the real data input by the user in a following automated click. The other script may only receive fabricated data such that even if the data is exfiltrated, the user may not suffer any security or privacy issues.

Figure 6:
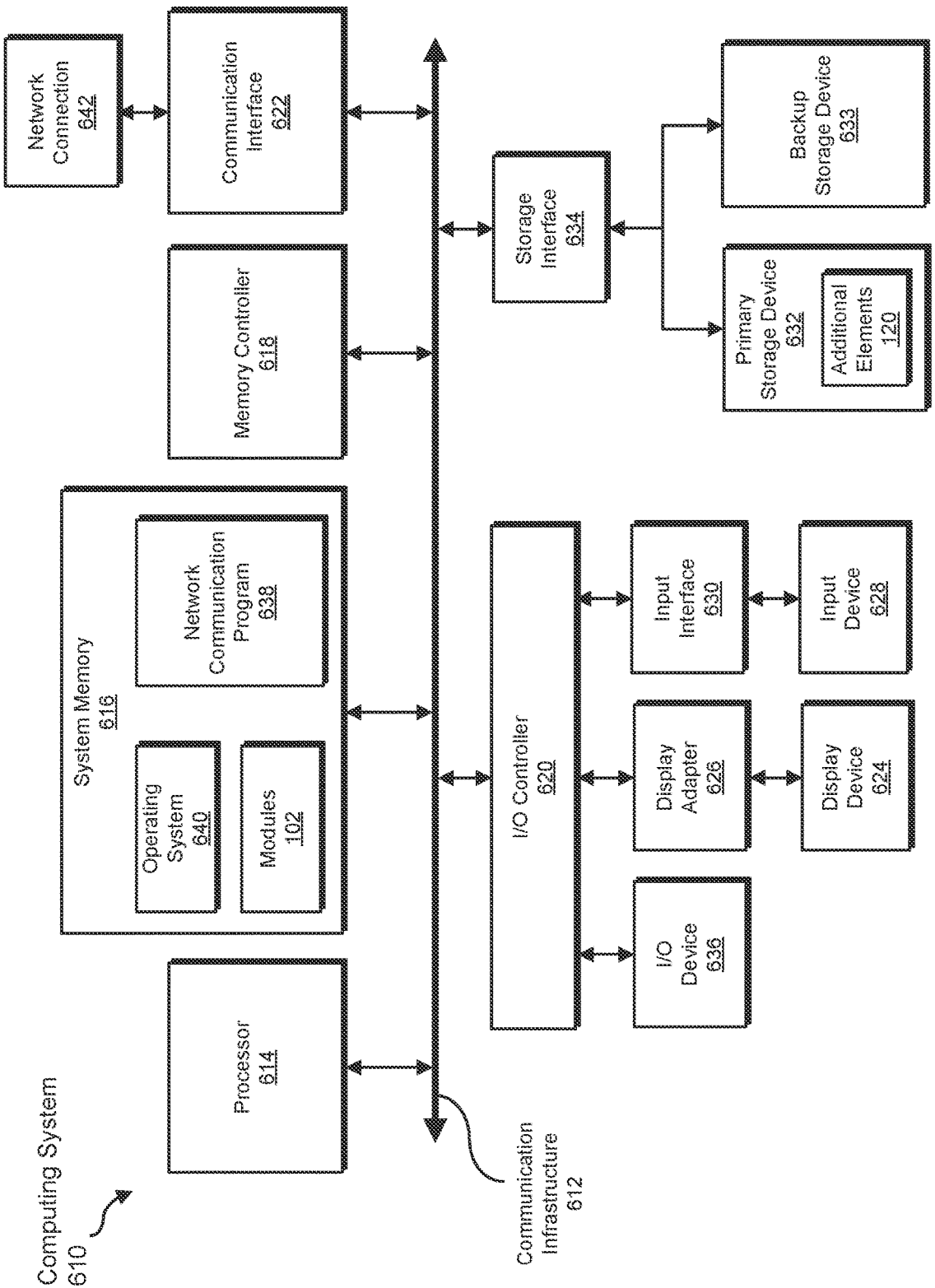
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, additional elements 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
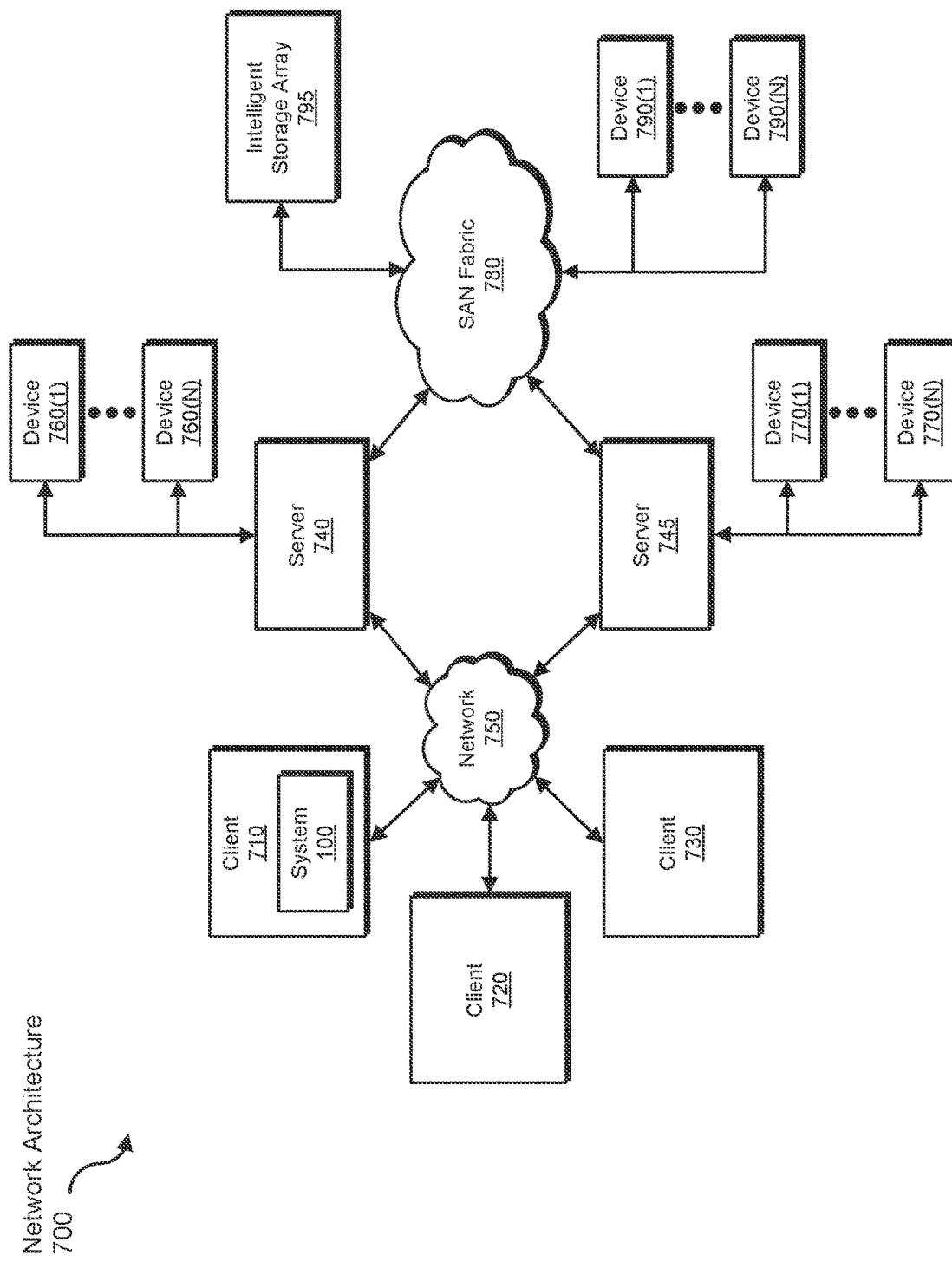
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for dynamic formjacking protection.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive webform data to be transformed, transform the webform data, output a result of the transformation to provide a secure isolated container, use the result of the transformation to protect sensitive data, and store the result of the transformation to submit sensitive data as needed. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for dynamic formjacking protection, at least a portion of the method being performed by a computing device comprising at least one processor, the method comprising:
    identifying a sensitive data input field element on a webform loaded in a browser;
    creating a secure isolated container overlaid on the identified sensitive data input field element;
    collecting, via the secure isolated container, real input data intended for the sensitive data input field element;
    inserting dummy data into the sensitive data input field element in response to collecting the real input data;

intercepting a form submit request from the webform to a destination, wherein the form submit request is prevented by the secure isolated container from including the real input data;

determining whether the destination is a trusted destination;

when the destination is determined to be the trusted destination, modifying the form submit request to allow the real input data to be sent to the trusted destination; and sending the form submit request to the destination.

2. The method of claim 1, wherein identifying the sensitive data input field element is based on an element attribute of the sensitive data input field element that is indicative of sensitive data.

3. The method of claim 1, wherein the secure isolated container comprises an inline frame including an input field.

4. The method of claim 1, wherein the secure isolated container is associated with a secure domain.

5. The method of claim 1, wherein the secure isolated container is subject to one or more security mechanisms.

6. The method of claim 5, wherein the one or more security mechanisms prevents a non-included script from accessing the secure isolated container.

7. The method of claim 5, wherein the one or more security mechanisms includes a same-origin policy that prevents elements having a different origin than an origin of the secure isolated container from interacting with the secure isolated container.

8. The method of claim 1, wherein determining whether the destination is a trusted destination is based on a whitelist.

9. The method of claim 1, further comprising:

determining that the destination is not the trusted destination; and performing a security action.

10. The method of claim 9, wherein performing the security action comprises:

sending the form submit request with the dummy data to the destination; and analyzing a behavior from the destination in response to sending the form submit request.

11. The method of claim 1, wherein modifying the form submit request further comprises:

identifying the dummy data in the form submit request; and replacing the dummy data in the form submit request with the real input data.

12. The method of claim 1, wherein:

modifying the form submit request further comprises initiating a second form submit request using the real input data to replace the form submit request; and sending the form submit request further comprises sending the second form submit request to the trusted destination.

13. A system for dynamic formjacking protection, the system comprising:

an identification module, stored in memory, configured to identify a sensitive data input field element on a webform loaded in a browser;

a container module, stored in memory, configured to create a secure isolated container overlaid on the identified sensitive data input field element;

a collection module, stored in memory, configured to collect, via the secure isolated container, real input data intended for the sensitive data input field element;

a dummy module, stored in memory, configured to insert dummy data into the sensitive data input field element in response to collecting the real input data;

a security module, stored in memory, configured to intercept a form submit request from the webform to a destination, wherein the form submit request is prevented by the secure isolated container from including the real input data, determine whether the destination is a trusted destination, and when the destination is determined to be the trusted destination, modifying the form submit request to allow the real input data to be sent to the trusted destination;

a submit module, stored in memory, configured to send the form submit request to the destination; and at least one physical processor that executes the identification module, the container module, the collection module, the dummy module, the security module, and the submit module.

14. The system of claim 13, wherein identifying the sensitive data input field element is based on an element attribute of the sensitive data input field element that is indicative of sensitive data.

15. The system of claim 13, wherein the secure isolated container comprises an inline frame including an input field and the secure isolated container is associated with a secure domain.

16. The system of claim 13, wherein the secure isolated container is subject to one or more security mechanisms, the one or more security mechanisms prevents a non-included script from accessing the secure isolated container, and the one or more security mechanisms includes a same-origin policy that prevents elements having a different origin than an origin of the secure isolated container from interacting with the secure isolated container.

17. The system of claim 13, wherein the security module is further configured to:

determine that the destination is not the trusted destination;

send, in response to determining that the destination is not the trusted destination, the form submit request with the dummy data to the destination; and analyze a behavior from the destination in response to sending the form submit request.

18. The system of claim 13, wherein modifying the form submit request further comprises:

identifying the dummy data in the form submit request; and replacing the dummy data in the form submit request with the real input data.

19. The system of claim 13, wherein:

modifying the form submit request further comprises initiating a second form submit request using the real input data to replace the form submit request; and sending the form submit request further comprises sending the second form submit request to the trusted destination.

20. A non-transitory computer-readable medium comprising one or more computer-executable instructions that, when executed by at least one processor of a computing device, cause the computing device to:

identify a sensitive data input field element on a webform loaded in a browser;

create a secure isolated container overlaid on the identified sensitive data input field element;

collect, via the secure isolated container, real input data intended for the sensitive data input field element;

insert dummy data into the sensitive data input field element in response to collecting the real input data;
intercept a form submit request from the webform to a destination, wherein the form submit request is prevented by the secure isolated container from including the real input data;
determine whether the destination is a trusted destination;
when the destination is determined to be the trusted destination, modifying the form submit request to allow the real input data to be sent to the trusted destination; and
send the form submit request to the destination.

\* \* \* \* \*